(12) United States Patent
Huang et al.

(10) Patent No.: US 10,057,590 B2
(45) Date of Patent: Aug. 21, 2018

(54) METHOD AND APPARATUS USING SOFTWARE ENGINE AND HARDWARE ENGINE COLLABORATED WITH EACH OTHER TO ACHIEVE HYBRID VIDEO ENCODING

(71) Applicant: MediaTek Inc., Hsin-Chu (TW)

(72) Inventors: Chao-Chih Huang, New Taipei (TW); Ting-An Lin, Hsinchu (TW); Shen-Kai Chang, Zhubei (TW); Han-Liang Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 143 days.

(21) Appl. No.: 15/265,896

(22) Filed: Sep. 15, 2016

(65) Prior Publication Data

US 2017/0006294 A1    Jan. 5, 2017

Related U.S. Application Data

(63) Continuation-in-part of application No. 14/154,132, filed on Jan. 13, 2014.
(Continued)

(51) Int. Cl.
*H04N 7/12* (2006.01)
*H04N 19/42* (2014.01)
(Continued)

(52) U.S. Cl.
CPC ........... *H04N 19/439* (2014.11); *H04N 19/42* (2014.11); *H04N 19/43* (2014.11); *H04N 19/423* (2014.11); *H04N 19/433* (2014.11)

(58) Field of Classification Search
CPC .................................................. H04N 19/439
See application file for complete search history.

(56) References Cited

U.S. PATENT DOCUMENTS 4,679,079 A * 7/1987 Catros ................... H04N 19/50
                                                                375/240.14
5,276,785 A * 1/1994 Mackinlay .......... G06F 3/04815
                                                                345/427
(Continued)

FOREIGN PATENT DOCUMENTS

| CN | 101390397 A | 3/2009 |
| CN | 101472181 A | 7/2009 |
| CN | 102301717 A | 12/2011 |

OTHER PUBLICATIONS

"International Search Report" dated Apr. 22, 2014 for International application No. PCT/CN2014/070978, International filing date: Jan. 21, 2014.

*Primary Examiner* — Tracy Y Li
(74) *Attorney, Agent, or Firm* — McClure, Qualey & Rodack, LLP

(57) ABSTRACT

A hybrid video encoding method and system using a software engine and a hardware engine. The software engine receives coding unit data associated with a current picture, and performs a first part of the video encoding operation by executing instructions. The first part of the video encoding operation generates an inter predictor and control information corresponding to the coding unit data of the current picture. The first part of the video encoding operation stores the inter predictor into an off-chip memory. The hardware engine performs a second part of the video encoding operation according to the control information. The second part of the video encoding operation receives the inter predictor, and subtracts the inter predictor from the coding unit data to generate a residual signal. The second part of the video encoding operation then transforms and quantizes the residual signal to generate transformed and quantized residual signal, and encodes the transformed and quantized residual signal to generate an encoded video bitstream.

14 Claims, 9 Drawing Sheets

Related U.S. Application Data

(60) Provisional application No. 62/221,958, filed on Sep. 22, 2015.

(51) Int. Cl.
  *H04N 19/43* (2014.01)
  *H04N 19/433* (2014.01)
  *H04N 19/423* (2014.01)

(56) References Cited

U.S. PATENT DOCUMENTS

| | | | |
|---|---|---|---|
| 5,594,813 A * | 1/1997 | Fandrianto | H04N 5/145 348/415.1 |
| 5,920,353 A | 7/1999 | Diaz et al. | |
| 6,167,090 A | 12/2000 | Iizuka | |
| 6,388,707 B1 * | 5/2002 | Suda | H04N 5/23212 348/333.03 |
| 8,738,860 B1 | 5/2014 | Griffin et al. | |
| 9,332,264 B2 | 5/2016 | Lu et al. | |
| 2001/0041054 A1 | 11/2001 | Dierke | |
| 2003/0185306 A1 * | 10/2003 | MacInnis | G06F 9/3861 375/240.25 |
| 2004/0001110 A1 * | 1/2004 | Khan | G06F 3/04815 715/848 |
| 2004/0071354 A1 * | 4/2004 | Adachi | H04N 19/46 382/236 |
| 2005/0021567 A1 | 1/2005 | Holenstein et al. | |
| 2006/0104364 A1 * | 5/2006 | Kim | H04N 19/61 375/240.25 |
| 2007/0236514 A1 * | 10/2007 | Agusanto | A61B 1/00193 345/646 |
| 2008/0033240 A1 * | 2/2008 | Hoffman | A61B 90/36 600/109 |
| 2008/0240587 A1 * | 10/2008 | Au | H04N 19/593 382/236 |
| 2008/0301681 A1 | 12/2008 | Sakamoto et al. | |
| 2008/0316977 A1 | 12/2008 | Malladi | |
| 2008/0317146 A1 | 12/2008 | Kwon et al. | |
| 2009/0168883 A1 | 7/2009 | Lu | |
| 2010/0014588 A1 | 1/2010 | Nakazato et al. | |
| 2010/0189179 A1 | 7/2010 | Gu | |
| 2010/0228265 A1 * | 9/2010 | Prisco | B25J 9/1689 606/130 |
| 2012/0063516 A1 | 3/2012 | Kwon et al. | |
| 2012/0170648 A1 | 7/2012 | Chen et al. | |
| 2013/0016783 A1 * | 1/2013 | Kim | H04N 19/176 375/240.13 |
| 2013/0070842 A1 * | 3/2013 | Gordon | H04N 19/159 375/240.02 |
| 2013/0195187 A1 * | 8/2013 | Kondo | H04N 19/80 375/240.12 |
| 2013/0202025 A1 | 8/2013 | Baron et al. | |
| 2013/0301727 A1 * | 11/2013 | Huang | H04N 19/00587 375/240.16 |
| 2015/0195577 A1 | 7/2015 | Hannuksela | |

* cited by examiner

METHOD AND APPARATUS USING SOFTWARE ENGINE AND HARDWARE ENGINE COLLABORATED WITH EACH OTHER TO ACHIEVE HYBRID VIDEO ENCODING

CROSS REFERENCE TO RELATED APPLICATIONS

This application is a continuation-in-part of application Ser. No. 14/154,132, filed on Jan. 13, 2014. This application also claims the benefit of U.S. Provisional Application Ser. No. 62/221,958 filed on Sep. 22, 2015. The U.S. patent applications are hereby incorporated by reference in their entireties.

FIELD OF THE INVENTION

The disclosed embodiments of the present invention relate to image and video encoding, and more particularly, to a method and apparatus using a software engine and a hardware engine collaborated with each other to achieve hybrid video encoding.

BACKGROUND AND RELATED ART

Digital video compression is incorporated into a wide range of devices, including modern consumer electronics, portable and personal communication devices, wireless and wired networking products, broadband networks and multimedia applications. A number of different standards of digital video compression have emerged including MPEG-4, H. 264/AVC, HEVC, VP8, VP9, AVS2 and extensions of such standards.

Although a full hardware video encoder or video codec meets the performance requirements for video compression techniques, the cost of such a full hardware solution is still high. Computation capability of a programmable engine (i.e., a software engine which performs functions by instruction execution) becomes powerful nowadays, but still can't meet the high-end specification of video encoding, such as 720p@30 fps or 1080p@30 fps encoding. In addition, power consumption of the programmable engine is higher than that of the full hardware solution. Furthermore, the memory bandwidth could be another issue when a programmable engine is used. Besides, resource of the programmable engine could be time-variant during video encoding when different applications, including an operation system (OS), are also running on the same programmable engine.

Thus, there is a need for an innovative video encoding design which can take advantage and benefit possessed by hardware-based implementation and software-based implementation to accomplish the video encoding operation.

SUMMARY

A hybrid video encoding method and system using a software engine and a hardware engine collaborating with each other to perform a video encoding operation. The software engine receives coding unit data associated with a current picture, and performs a first part of the video encoding operation by a software engine to execute a plurality of instructions. The first part of the video encoding operation generates an inter predictor and control information corresponding to the coding unit data of the current picture. The inter predictor comprises image blocks for luma component and chroma components. The first part of the video encoding operation also stores the inter predictor into an off-chip memory through a memory controller. The hardware engine performs a second part of the video encoding operation according to the control information. The second part of the video encoding operation receives the inter predictor from the off-chip memory, and subtracts the inter predictor from the coding unit data to generate a residual signal. The second part of the video encoding operation then transforms and quantizes the residual signal to generate transformed and quantized residual signal, and encodes the transformed and quantized residual signal to generate an encoded video bitstream.

In one aspect of the hybrid video encoding method and system, the software engine determines a description of the coding unit in the current picture, adjustable header parameter for the current picture, or both description and adjustable header parameter. Some examples of the description determined by the software engine comprise mode information, motion information, and both mode and motion information for each block. Some examples of the adjustable header parameter comprise filtering information and reference picture indication. The description and the adjustable header parameter are included in the control information and delivered to the hardware engine. The hardware engine performs the second part of the video encoding operation to each coding unit according to the corresponding description and adjustable header parameter.

An embodiment of the software engine comprises at least a cache buffer, and the hardware engine issues a data access request by using the cache buffer. The software engine stores the inter predictors and the control information in the cache buffer.

In one aspect of the hybrid video encoder, the hardware engine generates one or more of an encoded bitstream corresponding to the current picture, reconstructed data corresponding to the current picture, and side information or statistics of the current picture.

In another aspect of the hybrid video encoder, the first part of the video encoding operation comprises performing motion estimation and motion compensation on source frame data of the current picture using a reconstructed picture as a reference picture. The reconstructed picture corresponds to a previous picture in coding order, and the reconstructed picture may he an output of the hardware engine or the output being further post processed by the software engine. For example, the output of the hardware engine is reconstructed data before deblocking filtering, the software engine deblocking filters the reconstructed data and then used for motion estimation and motion compensation. The second part of the video encoding operation comprises one or a combination of an intra prediction function, a transform function, a quantization function, an inverse transform function, an inverse quantization function, a post processing function, a loop filter function, and an entropy encoding function.

Some exemplary control information generated by the software engine comprise mode information, motion information, quantization information, block partition structure, in-loop filter parameters, and a combination thereof. At least a portion of the control information generated by the software engine is incorporated in an encoded video bitstream.

Other aspects and features of the invention will become apparent to those with ordinary skill in the art upon review of the following descriptions of specific embodiments.

DETAILED DESCRIPTION

Figure 1:
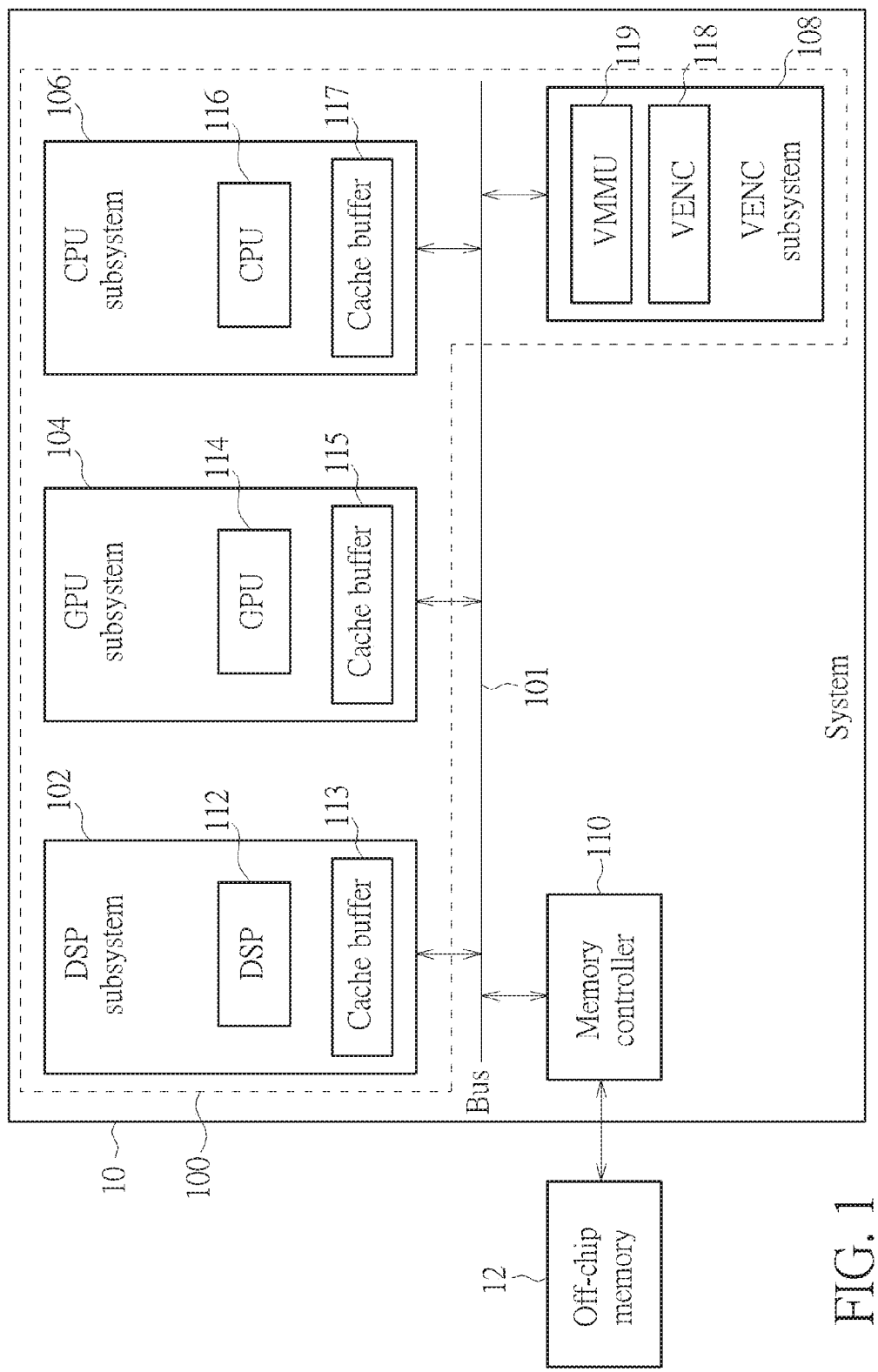
FIG. 1 is a block diagram illustrating a hybrid video encoder according to a first embodiment of the present invention.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiment.

Furthermore, the described features, structures, or characteristics may he combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

As the computation capability of a programmable engine is being continually improved, the modem CPU, DSP, or GPU usually has specific instructions (e.g., SIMD (single instruction multiple data) instruction sets) or acceleration units to improve the performance of regular computation. With some conventional fast motion estimation (ME) algorithms, software motion estimation is feasible on programmable engine(s). The proposed method takes advantage of new instructions available in a programmable processor. It also takes advantage of a large cache buffer of a programmable processor. At last, software motion estimation is feasible due to advanced motion estimation algorithm. The software performing ME function may run on a single programmable engine or multiple programmable engines (e.g., processor cores).

Please refer to FIG. 1, which is a block diagram illustrating a hybrid video encoder 100 according to a first embodiment of the present invention. FIG. 1 shows a simplified diagram of the video encoder 100 embedded in a system 10. That is, the hybrid video encoder 100 may be a portion of an electronic device, and more particularly, may be a portion of a main control circuit such as an integrated circuit (IC) within the electronic device. Examples of the electronic device may include, but not limited to, a mobile phone (e.g. a smartphone or a feature phone), a mobile computer (e.g. tablet computer), a personal digital assistant (PDA), and a personal computer such as a laptop computer or desktop computer. The hybrid video encoder 100 includes at least one software engine (i.e., software encoder part) which performs intended functionality by executing instructions (i.e., program codes), and further includes at least one hardware engine hardware encoder part) which performs intended functionality by using pure hardware. In other words, the hybrid video encoder 100 is arranged to perform a video encoding operation through collaborated software and hardware.

In this embodiment, the system 10 may be a system on chip (SoC) having a plurality of programmable engines included therein, where one or more of the programmable engines may he used to serve as software engine(s) needed by the hybrid video encoder 10. By way of example, but not limitation, programmable engines may be a DSP subsystem 102, a GPU subsystem 104 and a CPU subsystem 106. It should be noted that the system 10 may further have other programmable hardware that can execute fed instructions or can be controlled by a sequencer. The DSP subsystem 102 includes a DSP (e.g. CEVA XC321 processor) 112 and a cache buffer 113. The GPU subsystem 104 includes a GPU (e.g. nVidia Tesla K20 processor) 114 and a cache buffer 115. The CPU subsystem 106 includes a CPU (e.g. Intel Xeon processor) 116 and a cache buffer 117. Each of the cache buffers 113, 115, 117 may be consisted of one or more caches. For example, the CPU 116 may have a level one (L1) cache and a level two (L2) cache. For another example, the CPU 116 may have multi-core architecture, and each core has its own level one (L1) cache while multiple cores share one level two (L2) cache. For another example, the CPU 116 may have multi-cluster architecture, and each cluster may have a single core or multiple cores. These clusters may further share a level three (L3) cache. Different types of programmable engines may further share a next level of cache hierarchical organization. For example, the CPU 116 and the GPU 114 may share one cache.

The software engine (i.e., one or more of DSP subsystem 102, GPU subsystem 104 and CPU subsystem 106) of the hybrid video encoder 100 is arranged to perform a first part of a video encoding operation by executing a plurality of instructions. For example, the first part of the video encoding operation may include at least a motion estimation (ME) function.

The video encoder (VENC) subsystem 108 in FIG. 1 is a hardware engine of the hybrid video encoder 100, and arranged to perform a second part of the video encoding operation by using pure hardware. The VENC subsystem 108 includes a video encoder (VENC) 118 and a memory management unit (VMMU) 119. Specifically, the VENC 118 performs other encoding steps other than that (e.g., motion estimation) done by the programmable engine(s). Hence, the second part of the video encoding operation may have at least one of a motion compensation function, an intra prediction function, a transform function (e.g., discrete cosine transform (DCT)), a quantization function, an inverse transform function (e.g., inverse DCT), an inverse quantization function, a post processing function (e.g. deblocking filter and sample adaptive offset fitter), and an entropy encoding function. Besides, a main video buffer may be used to store source video frames, reconstructed frames, deblocked frames, or miscellaneous information used during video encoding. This main video buffer is usually allocated in an off-chip memory 12 such as a dynamic random access memory (DRAM), a static random access memory (SRAM), or a flash memory. However, this main video buffer may also be allocated in an on-chip memory (e.g., an embedded DRAM).

The programmable engines, including DSP subsystem 102, GPU subsystem 104 and CPU subsystem 106, the hardware engine (VENC subsystem 108), and a memory controller 110 are connected to a bus 101. Hence, each of the programmable engines and the hardware engine can access the off-chip memory 12 through the memory controller 110.

Figure 2:
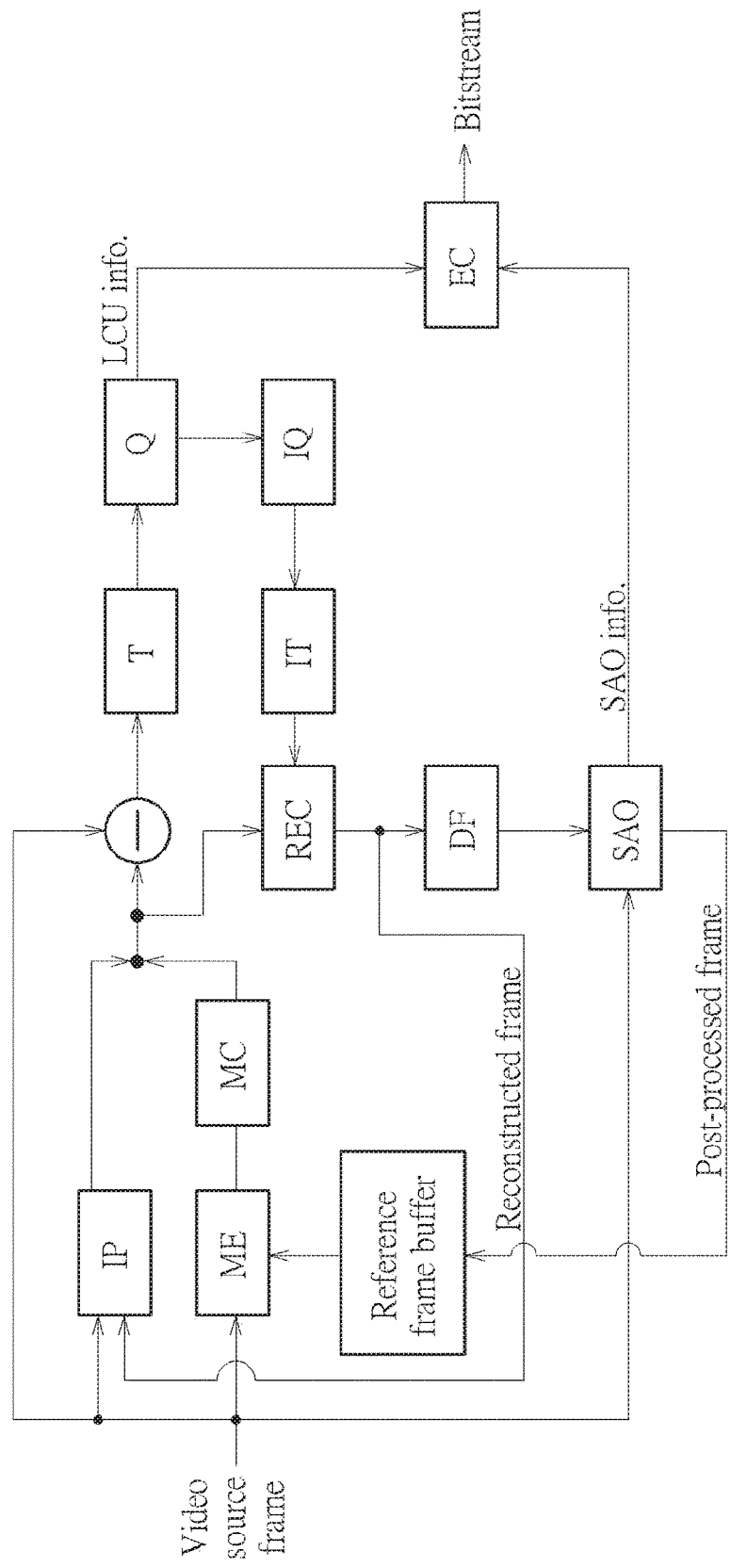
FIG. 2 is a diagram illustrating primary building blocks of a video encoding operation performed by the hybrid video encoder shown in FIG. 1.

Please refer to FIG. 2, which is a diagram illustrating primary building blocks of a video encoding operation performed by the hybrid video encoder 100 shown in FIG. 1, where ME means motion estimation, MC means motion compensation, T means transformation, IT means inverse transformation, Q means quantization, IQ means inverse quantization, REC means reconstruction, IP means intra prediction, EC means entropy coding, DF means deblocking filter, and SAO means sample adaptive offset filter. Video encoding may be lossless or lossy, depending upon actual design consideration.

One or more building blocks are implemented by software (i.e., at least one of the programmable engines shown in FIG. 1), while others are implemented by hardware (i.e., the hardware engine shown in FIG. 1). It should be noted that software part at least implements the ME functionality. Some video standards may or may not have in-loop filter(s), such as DF or SAO. Video source frames carry raw data of original video frames, and the primary objective of the hybrid video encoder 100 is to compress the video source frame data in a lossless way or a lossy way. Reference frames are frames used to define future frames. In older video encoding standards, such as MPEG-2, only one reference frame (i.e., a previous frame) is used for P-frames. Two reference frames (i.e., one past frame and one future frame) are used for B-frames. In more advanced video standards, more reference frames can be used for encoding a frame. Reconstructed frames are pixel data generated by a video encoder/decoder through performing inverse encoding steps. A video decoder usually performs inverse encoding steps from compressed bitstream, while a video encoder usually performs inverse encoding steps after it acquires quantized coefficient data.

The reconstructed pixel data may become reference frames per definition of the used video standards (H.261, MPEG-2, H.264, etc.). In a first case where a video standard does not support in-loop filtering, DF and SAO shown in FIG. 2 are omitted. Hence, the reconstructed frame is stored into the reference frame buffer to serve as a reference frame. In a second case where a video standard only supports one in-loop filter (i.e., DF), SAO shown in FIG. 2 is omitted. Hence, the post-processed frame is the deblocked frame, and stored into the reference frame buffer to serve as a reference frame. In a third case where a video standard supports more than one in-loop filter (i.e., DF and SAO), the post-processed frame is the SAOed frame, and stored into the reference frame buffer to serve as a reference frame. To put it simply, the reference frame stored in the reference frame buffer may be a reconstructed frame or a post-processed frame, depending upon the video coding standard actually employed by the hybrid video encoder 100. In the following, a reconstructed frame may be used as an example of a reference frame for illustrative purposes. However, a skilled person should readily appreciate that a post-processed frame may take the place of the reconstructed frame to serve as a reference frame when the employed video coding standard supports in-loop filter(s). The in-loop filters shown in FIG. 2 are for illustrative purposes only. In an alternative design, a different in-loop filter, such as an adaptive loop filter (ALF), may also be used. Further, intermediate data are data generated during video encoding processing. Intermediate data, such as motion vector information, quantized transformed residues, decided encoding modes (inter/intra/direction and so on), etc., may or may not be encoded into the output bitstream.

Due to the hardware/software partition with at least one software-based encoding step (e.g., motion estimation) and other hardware-based encoding steps (e.g., motion compensation, reconstruction, etc.), it's possible that the reconstructed frame (or post-processed frame) could not be available for motion estimation. For example, normally ME needs a video source frame M and a reconstructed frame M-1 for motion vector search. However, under frame-based interaction, the hardware engine (VENC subsystem 108) of the hybrid video encoder 100 may still be processing frame M-1. In this case, original video frames (e.g., video source frame M-1) may be used as reference frames of motion estimation; that is, reconstructed frames post-processed frames) are not used as reference frames of motion estimation. It should be noted that the motion compensation would be performed upon reconstructed frame (or post-processed frame) M-1 according to the motion estimation result derived from video source frames M and M-1. To put it simply, the video encoding operation performed by the hybrid video encoder 100 includes a motion estimation function and a motion compensation; when the motion estimation function is performed, a video source frame is used as a reference frame needed by motion estimation; and when the following motion compensation function is performed, a reconstructed frame (or a post-processed frame) is used as a reference frame needed by motion compensation.

Figure 3:
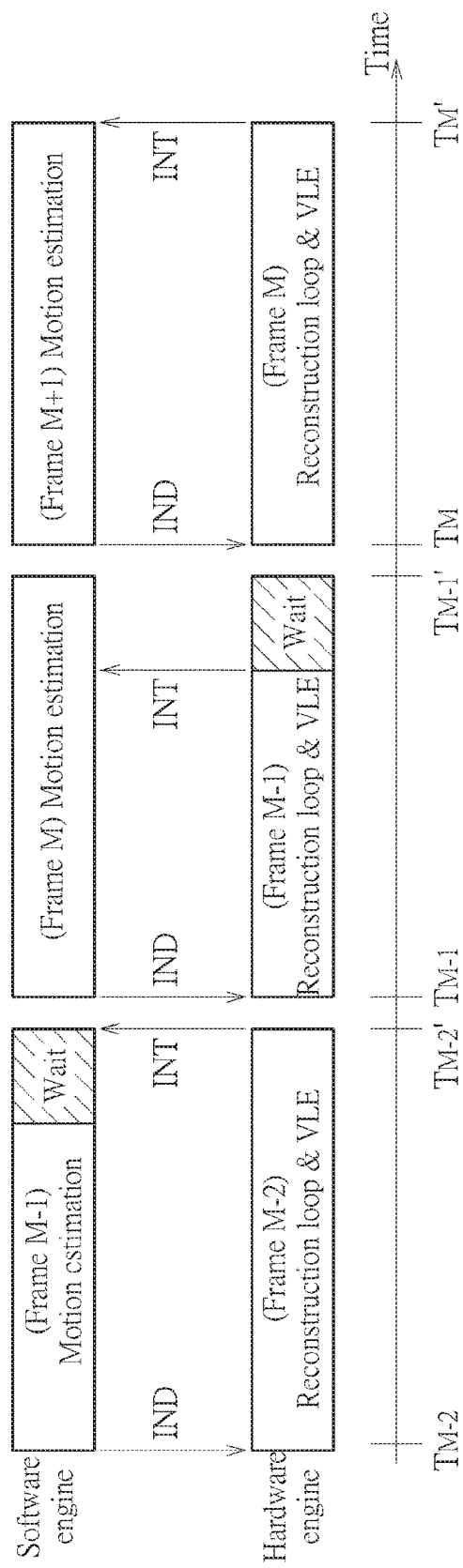
FIG. 3 is a diagram illustrating an example of a software engine and a hardware engine doing tasks and exchange information with a time interval of a frame encoding time.

FIG. 3 is a diagram illustrating an example of a software engine and a hardware engine doing tasks and exchange information with a time interval of a frame encoding time. The software engine (e.g., CPU subsystem 106) performs motion estimation, and sends motion information (e.g., motion vectors) to the hardware engine (e.g., VENC subsystem 108). The hardware engine does tasks other than motion estimation of the video encoding processing, such as motion compensation, transform, quantization, invert transform, inverse quantization, entropy encoding, etc. In other words, there would be data transfer/transaction between the software engine and the hardware engine due to the fact that the complete video encoding operation is accomplished by co-working of the software engine and the hardware engine. Preferably, the data transfer/transaction is performed between the software engine and the hardware engine through a cache buffer. Further details of the cache mechanism will be described later. The interaction interval here means the time or space interval that software and hardware engines should communicate to each other. An example of the communication method is sending an interrupt signal INT from the hardware engine to the software engine. As shown in FIG. 3, the software engine generates an indicator IND at time $T_{M-2}$ to notify the hardware engine, and transmits information associated with frame M-2 to the hardware part when finishing motion estimation of frame M-2 and starting motion estimation of the next frame M-1. When notified by the software engine, the hardware engine refers to the information given by the software engine to start the following encoding steps associated with the frame M-2 for obtaining a corresponding reconstructed frame M-2 and a bitstream of compressed frame M-2. The hardware engine notifies the software engine when finishing the following encoding steps associated with frame M-2 at time $T_{M-2}'$. As can be seen from FIG. 3, the processing speed of the software engine for frame M-1 is faster than that of the hardware engine for frame M-1. Hence, the software engine waits for finish of the following encoding steps associated with the frame M-2 that is performed by the hardware engine.

After being notified by the hardware engine, the software part transmits information associated with frame M-1 to the hardware engine and starts to perform motion estimation of the next frame M at time $T_{M-1}$. The software engine may also get information of compressed frame M-2 from the hardware engine. For example, the software engine may get the bitstream size, coding mode information, quality information processing time information, and/or memory bandwidth information of compressed frame M-2 from the hardware engine. When notified by the software engine, the hardware engine refers to the information given by the software engine to start the following encoding steps associated with the frame M-1 for obtaining a corresponding reconstructed frame M-1. The hardware engine notifies the software engine when finishing the following encoding steps associated with frame M-1 at time $T_{M-1}'$. As can be seen from FIG. 3, the processing speed of the software part for frame M is slower than that of the hardware engine for frame M-1. Hence, the hardware engine waits for finish of the encoding step associated with the frame M that is performed by the software engine.

After finishing the motion estimation of frame M, the software engine transmits information associated with frame M to the hardware part and starts motion estimation of frame M+1 at time $T_M$. When notified by the software engine, the hardware engine refers to the information given by the software engine to start the following encoding steps associated with the frame M for obtaining a corresponding reconstructed frame M. The hardware engine notifies the software engine when finishing the following encoding steps associated with frame M at time $T_M'$. As can be seen from FIG. 3, the processing speed of the software engine for frame M+1 is equal to that of the hardware part for frame M. Hence, the hardware engine and the software engine are not required to wait for each other.

It should be noted that the interaction interval of software and hardware parts is not limited to the time period of encoding a full frame. The interval may be one macroblock (MB), one largest coding unit (LCU), one slice, or one tile. The interval may also be several MBs, several LCUs, several slices, or several tiles. The interval may also be one or more MB (or LCU) rows. When the granularity of the interaction interval is small, it's possible that data of the reconstructed frame (or post-processed frame) could be available for motion estimation. For example, under a slice-based interaction (i.e., video encoding is performed based on slices rather than frames), the hardware engine and the software engine of the hybrid video encoder 100 may process different slices of the same source frame M, and the reconstructed frame M-1 (which is derived from a source frame M-1 preceding the current source frame M) may be available at this moment. In this case, when the software engine of the hybrid video encoder 100 is processing a slice of the source frame M, the reconstructed frame M-1 may be used as a reference frame to provide reference pixel data referenced by motion estimation performed by the software engine. In above example shown in FIG. 3, the software engine may wait for the hardware engine within one frame interval when needed. However, this is not meant to be a limitation of the present invention. For example, the software engine of the hybrid video encoder 100 may be configured to perform motion estimation upon a plurality of successive source frames continuously without waiting for the hardware engine of the hybrid video encoder 100.

There are several embodiments without departing from the spirit of the present invention, and all have the same property that ME is implemented by software running on one or more programmable engines. One embodiment is that the software engine handles ME while the hardware engine handles MC, T, Q, IQ, IT, EC. The hardware engine may further handle post processing, such as DB and SAO, for different video encoding standards. Another embodiment is that the software engine handles ME and MC while the hardware engine handles T, Q, IQ, IT, EC. The hardware engine may further handle post processing, such as DB, and SAO. These alternative designs all have ME implemented by software (i.e., instruction execution), and thus fall within the scope of the present invention.

In another embodiment, the software encoder part of the hybrid video encoder 100 performs ME on one or multiple programmable engines. The result of ME performed by the software encoder part is then used by the hardware encoder part of the hybrid video encoder 100. The result of ME may include, but not limited to, motion vectors, coding modes of coding units, reference frame index, single reference frame or multiple reference frames, and/or other information which can be used to perform inter or intra coding. The software encoder part may further determine the bit budget and quantization setting of each coding region (e.g., macroblock, LCU, slice, or frame). The software encoder part may also determine the frame type of the current frame to he encoded, and the determination may be based on at least part of information of ME result. For example, the software encoder part may determine the current frame as I frame, P frame, B frame, or other frame type. The software encoder part may also determine the slice number and slice type of the current frame to be encoded, and the determination might be based on at least part of information of ME result. For example, the software encoder part may determine to have two slices in the current frame to be encoded. The software encoder part may determine the current frame having the first slice to be encoded as an I slice and the other slice as a P slice. The software encoder part may further determine the region of said I slice and P slice. The determination of the first slice to be encoded as an I slice may be based on the statistic information collected during the ME. For example, the statistic information may include the video content complexity or the activity information of a region of whole frame, the motion information, the ME cost function information or other information generated from the ME on the first slice.

The software encoder part may perform a coarse motion estimation based on a down-scaled source frame (which is derived from an original source frame) and a down-scaled reference frame (which is derived from an original reference frame). The result of coarse motion estimation is then delivered to hardware encoder part. The hardware encoder part may perform final or fine motion estimation and corresponding motion compensation. On the other hand, the hardware encoder part may directly perform motion compensation without performing final motion estimation.

The software encoder part may further get the exact coding result from hardware encoder part to determine the search range of the following frame or frames to be encoded. For example, a vertical search range +/−48 is applied to encode a first frame. The coding result of this frame may indicate coded motion vectors are mainly within a range of +/−16 in vertical search range. The software encoder part then determines to shrink the vertical search range to +/−32 and apply this range for encoding a second frame. By way of example, but not limitation, the second frame may be any frame following the first frame. The determined search range can be further delivered to hardware encoder pan for motion estimation or other processing. The determination of search range can be treated as a part of motion estimation performed by software video encoder.

The software encoder part may further get motion information from another external unit to determine the search range. The external device unit may be a frame processing engine such as an image signal processor (ISP), electronic/optical image stabilization unit, graphic processing unit (GPU), a display processor, a motion filter, or a positional sensor. If a first frame to be encoded is determined as a static scene, the software encoder part may determine to shrink the vertical search range to +/−32 and apply this range for encoding this first frame.

In a case where the video standard is HEVC (High Efficiency Video Coding)/H.265, the software encoder part may also determine the tile number and tile parameter of the current frame to be encoded, and the determination might be based on at least part of information of ME result. For example, the software encoder part may determine to have two tiles, which each is 960×1080, in the current frame to be encoded for 1080p encoding. The software encoder part may also determine to have two tiles, which each is 1920×540, in the current frame to be encoded for 1080p encoding. These decisions then are used by the hardware encoder part to complete other processing of encoding.

The software encoder part takes advantage of cache buffer(s) of programmable engine(s) to store at least part of the current source frame data and at least part of the reference frame, leading to improved encoding performance due to lower data access latency. The reference frame could be the reconstructed frame or the post-processed frame. The cache buffer 113/115/117 used by the hybrid video encoder 100 may be level one cache(s), level two cache(s), level three cache(s), or even higher level cache(s).

For clarity and simplicity, it is assumed that the software engine of the hybrid video encoder 100 is implemented using the CPU subsystem 106. Hence, when performing motion estimation, the software engine (i.e., CPU subsystem 106) fetches the source frame and the reference frame from a large-sized frame buffer (e.g., off-chip memory 12). The hardware engine (i.e., VENC subsystem 108) will get source frame data or reference frame data from the cache buffer 117 of the software engine when the requested data is available in the cache buffer 117. Otherwise, source frame data or reference frame data will still be accessed from the large-sized frame buffer.

In this embodiment, a cache coherence mechanism is employed to check if the aforementioned data is inside the cache buffer 117 or not. The cache coherence mechanism fetches the data in the cache butler 117 when the data is inside the cache butler 117 or passes the data access request (i.e., a read request) to the memory controller 110 to get the requested data in the frame buffer. In other words, the cache controller of the CPU subsystem 106 serves a data access request issued from the hardware engine by using the cache buffer 117. When a cache hit occurs, the cache controller returns the cached data. When a cache miss occurs, the memory controller 110 will receive the data access request for those data desired by the hardware engine, and perform the data access transaction.

Two types of cache coherence mechanism can be applied in this embodiment. One is a conservative cache coherence mechanism, and the other is an aggressive cache coherence mechanism. To reduce the interference from the data access request issued from the hardware engine, the conservative cache coherence mechanism for the software engine and the hardware engine may be used. The conservative cache coherence mechanism handles only the read transaction; besides, when the data is not inside the cache buffer 117, no cache miss happens and no data replacement is performed. For example, a cache controller (not shown) inside the software engine or a bus controller (not shown) of the system 10 monitors/snoops the read transaction addresses on the bus 101 to which the software engine (CPU subsystem 106) and the hardware engine (VENC subsystem 108) are connected. When a transaction address of a read request issued by the hardware engine matches an address of a cached data inside the cache buffer 117, a cache hit occurs, and the cache controller directly transmits the cached data to the hardware engine.

It should be noted that the write transaction from the hardware engine is always handled by the controller of the next memory hierarchical organization, usually the off-chip memory 12 or the next level cache buffer. Hence, the cache controller of the CPU subsystem 106 may determine whether a data access request issued from the VENC subsystem 108 is to access the cache buffer 117 or a storage device (e.g., off-chip memory 12) different from the cache buffer 117. When the data access request issued from the VENC subsystem 108 is a write request, it is determined that the write request is to access the storage device off-chip memory 12). Hence, data transaction between the VENC subsystem 108 and the storage device (e.g., off-chip memory 12) is performed without through the cache buffer 117. When the software engine does need the write data from the hardware engine, a data synchronization mechanism will be applied to indicate that the write data is available for the software engine. Further details of the data synchronization mechanism will be described later.

Figure 4:
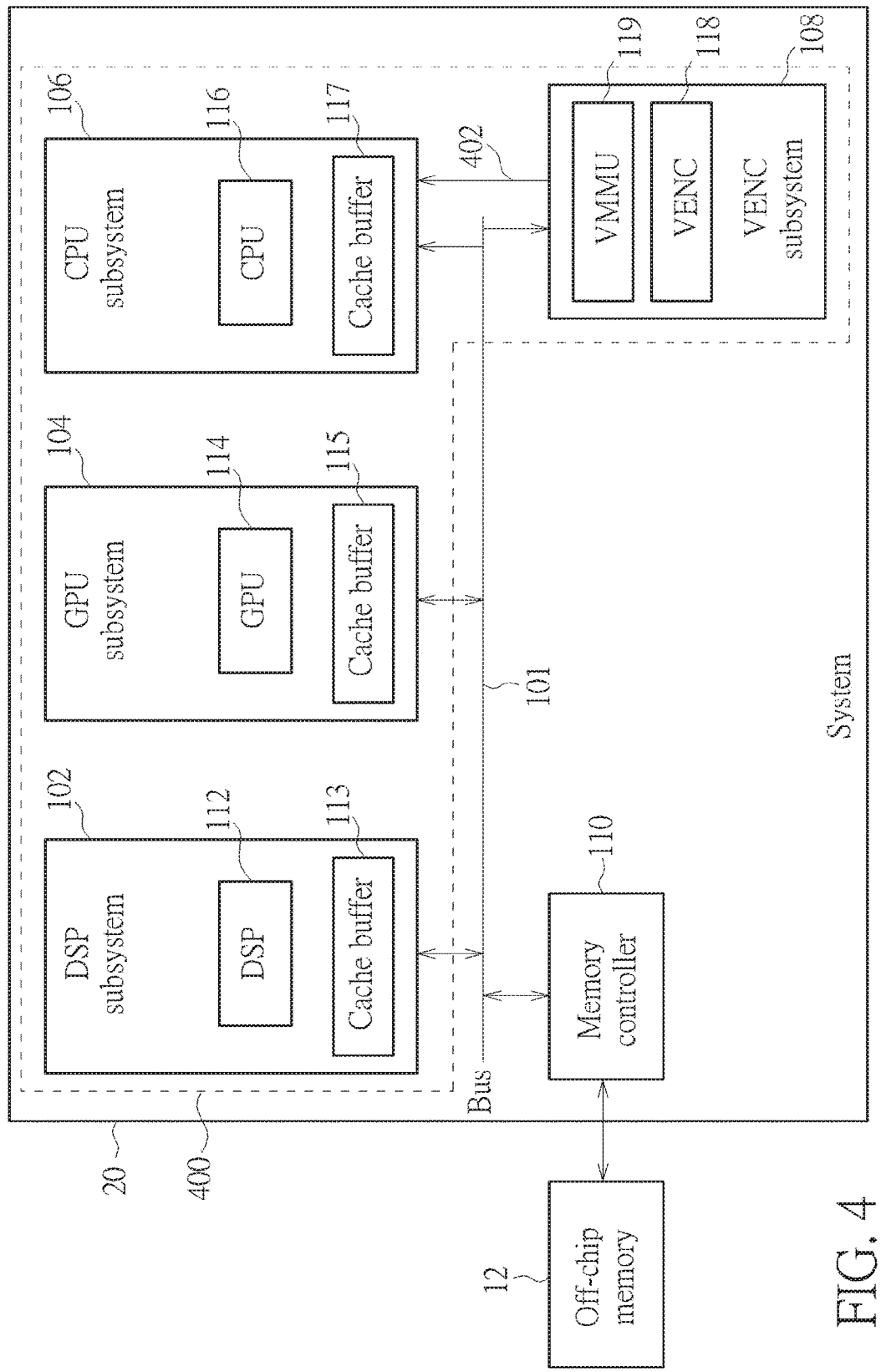
FIG. 4 is a diagram illustrating a hybrid video encoder according to a second embodiment of the present invention.

On the other hand, to let the hardware engine take more advantage of cache buffer(s) of programmable engine(s), the aggressive cache coherence mechanism may be used. Please refer to FIG. 4, which is a diagram illustrating a hybrid video encoder 40C according to a second embodiment of the present invention. The major difference between system 10 shown in FIG. 1 and system 20 shown in FIG. 4 is that a dedicated cache write line (i.e., an additional write path) 402 is implemented between the software engine and the hardware engine, thus allowing the hardware engine to write data into a cache buffer of the software engine. For clarity and simplicity, it is also assumed that the software engine is implemented by the CPU subsystem 106, and the hardware engine is implemented by the VENC subsystem 108. However, this is for illustrative purposes only, and is not meant to be a limitation of the present invention.

In a case where at least the motion estimation is performed by the CPU 116 of the CPU subsystem 106 which acts as the software engine, a cache write line is connected between the CPU subsystem 106 and the VENC subsystem 108. As mentioned above, the cache controller inside the programmable engine (e.g., CPU subsystem 106) monitors/snoops the read transaction addresses on the bus to which the programmable engine and the hardware engine (VENC subsystem 108) connects. Hence, the cache controller of the CPU subsystem 106 may determine whether a data access request issued from the VENC subsystem 108 is to access the cache buffer 117 or a storage device (e.g., off-chip memory 12) different from the cache buffer 117. When the data access request issued from the VENC subsystem 108 is a read access and the requested data is available in the cache buffer 117, a cache hit occurs and makes the cache controller to transmit requested data from the cache buffer 117 to the VENC subsystem 108. When the data access request issued from the VENC subsystem 108 is a read access and the requested data is not available in the cache buffer 117, a cache miss occurs and makes the cache controller to issue a memory read request to its next memory hierarchical organization, usually the off-chip memory 12 or the next level cache buffer. The read data returned from the next memory hierarchical organization then replaces a cache line or an equal-amount data in the cache buffer 117. The read data returned from the next memory hieratical organization is also transferred to the VENC subsystem 108.

When the data access request from the VENC subsystem 108 is a write request for storing a write data into the cache buffer 117 of the CPU subsystem 106, "write back" or "write through" policy could be applied. For the write back policy, the write data from the VENC subsystem 108 is transmitted to the CPU subsystem 106 and thus written into the cache buffer 117 initially via the dedicated cache write line 402. The write data from the VENC subsystem 108 is written into the next memory hierarchical organization through the bus 101 when the cache blocks/lines containing the write data are about to be modified/replaced by new content. For the write through policy, the write data from the VENC subsystem 108 is synchronously written into the cache buffer 117 through the dedicated cache write line 402 and the next memory hierarchical organization through the bus. As a person skilled in the art can readily understand details of write back policy and write through policy, further description is omitted here for brevity.

In addition to the software encoder part, an operation system (OS) may also run on the same programmable engine(s). In this case, in addition to the cache buffer, the programmable engine also has a memory protect unit (MPU) or memory management unit (MMU), in which a translation of virtual addresses to physical addresses is performed. To make the data stored in the cache buffer being accessed by the hardware engine, an address synchronization mechanism which ensures the same entry of the cache buffer can be correctly addressed and accessed by the hardware engine and software engine is applied. For example, the data access request issued from the VENC subsystem 108 is processed by another translation of virtual addresses to physical addresses via the VMMU 119, and this translation function is synchronous with the one inside the CPU subsystem 106.

To further make use of the cache buffer, a data synchronization mechanism is applied. The data synchronization mechanism helps to increase the opportunity that the data to be read is already in the cache buffer and therefore reduces the probability of obtaining data from the next memory hierarchical organization, e.g., the off-chip memory 12 or the next level cache buffer. The data synchronization mechanism also helps to reduce the opportunity of the cache miss or data replacement of the cache buffer.

The data synchronization mechanism includes an indicator (e.g., IND as shown in FIG. 3) that notifies the hardware engine (e.g., VENC subsystem 108) the desired data is now available in the cache buffer of the software engine (e.g., cache buffer 117 of CPU subsystem 106). For example, when the software engine finishes performing ME of a frame, the software engine sets the indicator. The hardware engine then performs remaining encoding processing on the same frame. The data read by the software engine, such as the source frame data and the reference frame data, are likely still inside the cache buffer. More specifically, when the granularity of the interaction interval as mentioned above is set smaller, it is more likely that data read by the software engine are still available in the cache buffer of the software engine when the hardware engine is operative to perform remaining encoding processing on the same frame previously processed by the software engine. Therefore, the hardware engine can read these data from the cache buffer instead of the next memory hierarchical organization (e.g., off-chip memory 12). Furthermore, the result generated by the software engine, such as the motion vectors, the motion compensated coefficient data, the quantized coefficients, the aforementioned intermediate data, is also likely still inside the cache buffer of the software engine. Therefore, the hardware engine can also read these data from the cache buffer instead of the next memory hierarchical organization (e.g., off-chip memory 12). The indicator can be implemented using any feasible notification means. For example, the indicator may be a trigger, a flag or a command queue of the hardware engine.

Alternatively, a more aggressive data synchronization mechanism may be employed. For example, when the software engine (e.g., CPU subsystem 106) finishes performing ME on a coding region, such as a number of macroblocks in a full frame, the software engine sets the indicator. That is, the indicator is set to notify the hardware engine (e.g., VENC subsystem 108) each time ME of a portion of a full frame is finished by the software engine. The hardware engine then performs remaining encoding processing on the portion of the frame. The data read by the software engine, such as the source frame data and the reference frame data, and the data generated by the software engine, such as the motion vectors and the motion compensated coefficient data, are also likely still inside the cache buffer of the soft engine. Therefore, the hardware engine can read these data from the cache buffer instead of the next memory hierarchical organization (e.g., off-chip memory 12). Similarly, the indicator can be implemented using any feasible notification means. For example, the indicator may be a trigger, a flag or a command queue of the hardware engine. For another example, the indicator may be the position information of macroblocks be processed or to be processed, or the number of macroblocks be processed or to be processed.

Besides, the hardware engine can also apply similar data synchronization method to notify the software engine. For example, when the hardware engine finishes writing parts of reconstructed frame data (or post-processed frame data) to the cache buffer of the software engine, the hardware engine could also set an indicator. The indicator set by the hardware engine may be, for example, an interrupt, a flag, the position information of macroblocks be processed or to be processed, or the number of macroblocks be processed or to be processed. etc.

The data synchronization mechanism may also incorporate a stall mechanism, such that the software engine or hardware engine is stalled when the data synchronization mechanism indicates that a stall is required. For example, when the hardware engine is busy and can't accept another trigger of next processing, a stall indicator would be generated by the hardware engine and indicate the software engine to stall such that the data in the cache buffer of the software engine would not be overwritten, replaced, or flushed. The stall indicator can be implemented using any feasible notification means. For example, the stall indicator may be a busy signal of the hardware engine or the fullness signal of the command queue. For another example, the stall indicator may be the position information of macroblocks be processed or to be processed. For another example, the indicator may be the number of macroblocks be processed or to be processed.

In summary, a method and apparatus of implementing video encoding with collaborated hardware and software parts are proposed by the present invention. It mainly takes advantage of powerful programmable engine(s) and corresponding cache buffer(s) and partial application specific hardware to reduce the chip area cost. Specifically, the proposed hybrid video encoder at least lets motion estimation task implemented by software, while at least one main task (one of MC, T, Q, IT, IQ, IP, DF, and SAO) is implemented by hardware.

Figure 5:
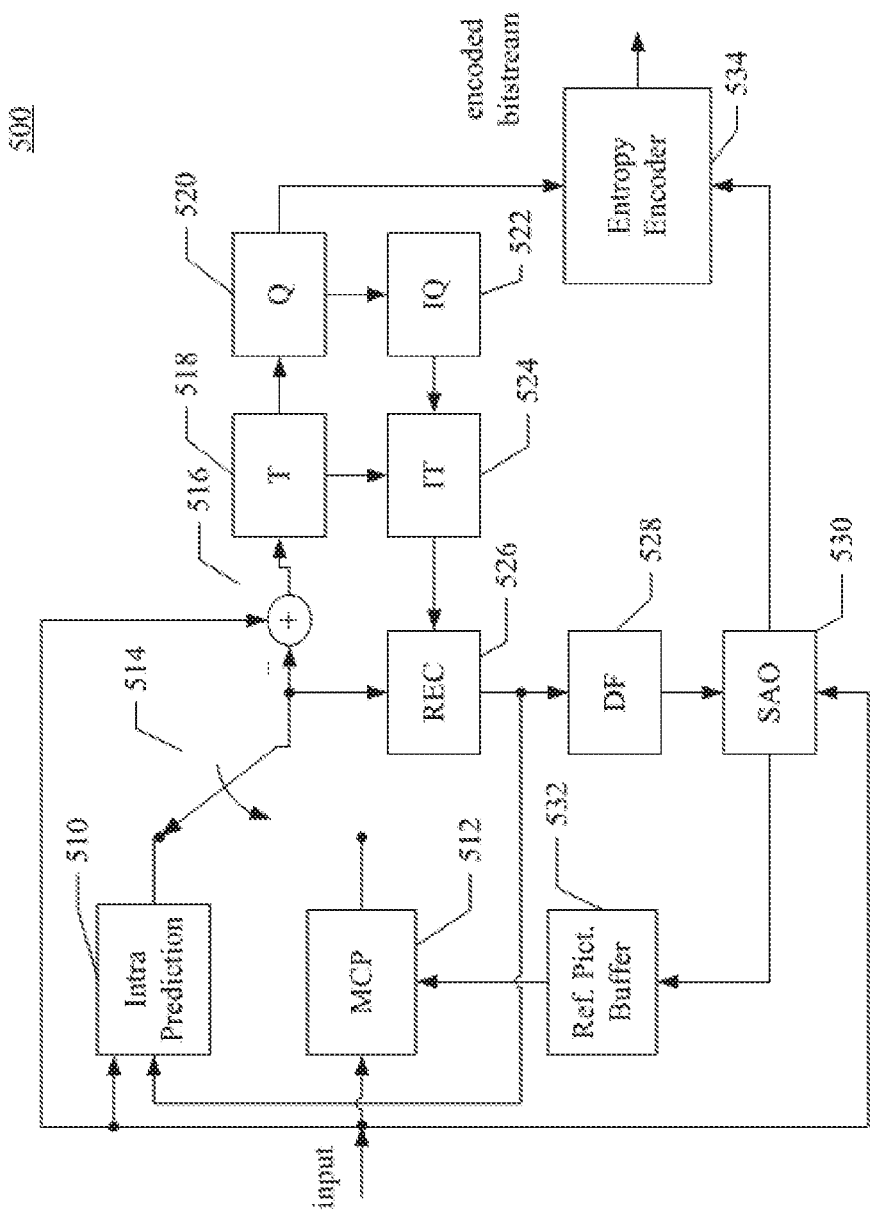
FIG. 5 illustrates an exemplary system block diagram for a Video Encoder based on High Efficiency Video Coding (HEVC) standard with adaptive Inter and motion compensation prediction.

FIG. 5 illustrates an exemplary system block diagram for a Video Encoder 500 based on High Efficiency Video Coding (HEVC) standard with adaptive Inter and motion compensation prediction. Intra Prediction 510 provides intra predictors based on reconstructed video data of a current picture. Motion Compensation Prediction (MCP) 512 performs motion estimation (ME) and motion compensation (MC) to provide inter predictors based on video data from other picture or pictures. The inter predictor consists of image blocks for luma component such as Y, and chroma components such as U and V, each block having a plurality of image pixels, corresponding to a coding unit or a macro block of the current picture. Each image pixel is represented by color intensity. Switch 514 selects either the intra predictors outputted from Intra Prediction 510 or the inter predictors outputted from the Motion Compensation Prediction 512 and supplies the selected predictors to Adder 516 to form prediction errors, also called prediction residual signal. The prediction residual signal is further processed by Transformation (T) 518 followed by Quantization (Q) 520. The transformed and quantized residual signal is then coded by Entropy Encoder 534 to form an encoded video bitstream. The encoded video bitstream associated with the transform coefficients is then packed with side information such as motion information. The data associated with the side information are also provided to Entropy Encoder 534. When motion compensation prediction mode is used, a reference picture or pictures have to be reconstructed at the encoder end as well. The transformed and quantized residual signal is thus processed by Inverse Quantization (IQ) 522 and Inverse Transformation (IT) 524 to recover the prediction residual signal of the reference picture or pictures. As shown in FIG. 5, the recovered prediction residual signal output from IT 524 is then combined with the predictors at Reconstruction (REC) 526 to produce reconstructed video data. The reconstructed video data may be stored in Reference Picture Buffer (Ref. Pict. Buffer) 532 and used for prediction of other pictures.

The reconstructed video data output from REC 526 may be subject to various impairments due to the encoding processing, consequently, in-loop Deblocking Filter (DF) 528 and Sample Adaptive Offset (SAO) 530 are applied to the reconstructed video data before storing in the Reference Picture Buffer 532 to further enhance picture quality. DF information from DF 528 and SAO information from SAO 530 are provided to Entropy Encoder 534 for incorporation into the encoded video bitstream so the same DF information and SAO information may he used when applying in-loop DF and SAO processing to reconstructed video data at the decoder.

Figure 6:
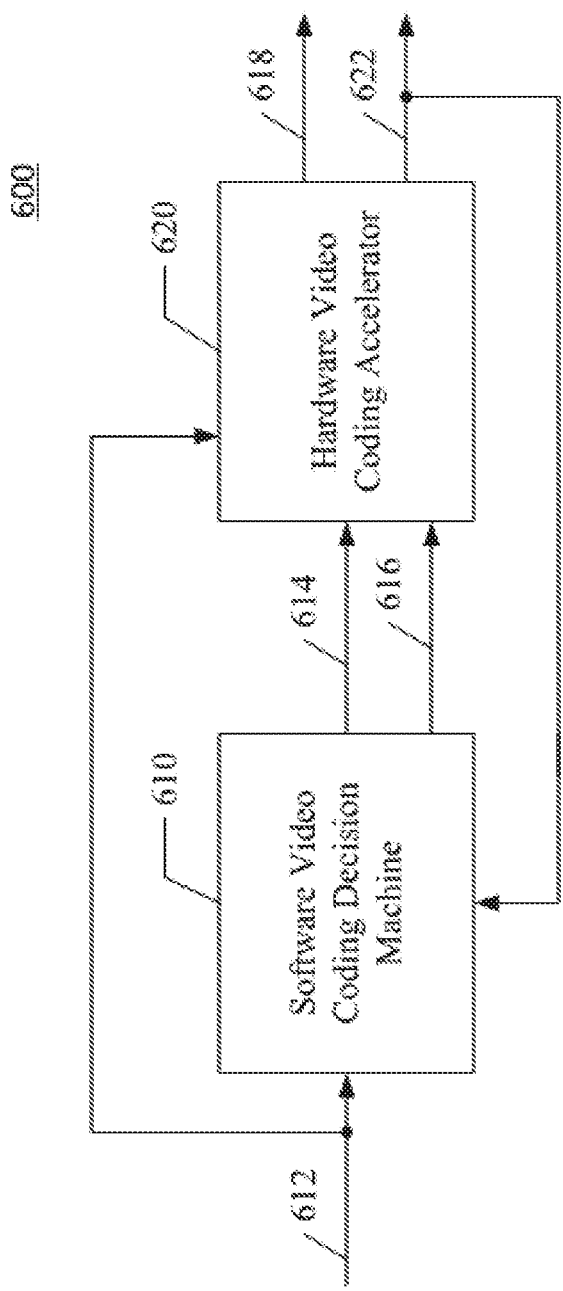
FIG. 6 illustrates an exemplary block diagram of a hybrid video encoder 600 according to an embodiment of the present invention.

FIG. 6 illustrates an exemplary block diagram of a hybrid video encoder 600 according to an embodiment of the present invention. The hybrid video encoder 600 comprises at least one software engine, Software Video Coding Decision Machine 610, which performs intended functionality by executing instructions, and further comprises at least one hardware engine, Hardware Video Coding Accelerator 620, which performs intended functionality by using pure hardware circuit. The hybrid video encoder 600 may be embedded in a system on chip (SoC). The software engine may be a DSP subsystem, a GPU subsystem, a CPU subsystem, or any other programmable hardware that can execute fed instructions or can be controlled by a sequencer.

Please refer to FIG. 1, FIG. 5 and FIG. 6, Software Video Coding Decision Machine 610 (e.g. DSP subsystem 102, GPU subsystem 104 or CPU subsystem 106) receives source frame data 612 and reconstructed video data 622 to perform a first part of video encoding operations by executing a plurality of instructions. The first part of the video encoding operations includes performing at least motion estimation and motion compensation (e.g. MCP 512 in FIG. 5) on the source frame data 612 in accordance with the reconstructed video data 622. The output of Software Video Coding Decision Machine 610 includes inter predictors 614 and control information 616. The inter predictors 614 and control information 616 are stored in a buffer, for example, in a cache buffer (e.g. cache buffer 113, 115, 117 shown in FIG. 1 and FIG. 4) of Software Video Coding Decision Machine 610 or stored in off-chip memory (e.g. off-chip memory 12 shown in FIG. 1 and FIG. 4). The rest of encoding operations are performed by the Hardware Video Coding Accelerator 620. The Hardware Video Coding Accelerator 620 includes Switch 514, Adder 516, Transformation circuit 518, Inverse transformation circuit 524, Quantization circuit 520, Inverse quantization circuit 522, Reconstruction circuit 526, Intra prediction circuit 510, Entropy coding circuit 534. Deblocking filter 528, and Sample adaptive offset filter 530. A data access request is issued from the Hardware Video Coding Accelerator 620 for accessing the inter predictors or a portion of the control information is served by using the cache buffer. Alternatively, the data access request issued from the Hardware Video Coding Accelerator 620 for accessing the inter predictors or the control information is served through the memory controller 110 to access the off-chip memory 12. Hardware Video Coding Accelerator 620 receives the source frame data 612, the inter predictors 614, and the control information 616 to perform a second part of the video encoding operations using pure hardware devices. The output of Hardware Video Coding Accelerator 620 comprises at least a video bitstream 618, the reconstructed video data 622, and any side information or statistics of the encoded pictures in the video bitstream 618. In some embodiments, the hardware engine incorporates at least a portion of the control information generated by the software engine in the video bitstream 618.

The control information 616 output from Software Video Coding Decision Machine 610 is used by Hardware Video Coding Accelerator 620 to perform the second part of the video encoding operations. Exemplary control information 616 includes a full description of each block such as macroblock (MB) or coding unit (CU) in the picture to be encoded and adjustable header parameters. For examples, the control information 616 includes modes and motion information for the coding blocks, loop filter strength, and reference picture indications. Hardware Video Coding Accelerator 620 generates the video bitstream 618 according to the given control information 616 so only limited encoding decisions are made by Hardware Video Coding Accelerator 620. Some examples of the limited encoding decisions include determining coded block patterns and changing mode to an equivalent short-cut mode. For example, Hardware Video Coding Accelerator in a H.264 hybrid video encoder changes a P_16×16 mode macroblock with Skip-MV but without any texture coefficient to a P-Skip mode.

Some video standards may or may not have in-loop filter(s), such as Deblocking Filter DF 528 and Sample Adaptive Offset SAO 530 in FIG. 5. When the video encoder includes one or more in-loop filters, the in-loop filter operations may be performed by the software part or hardware part according to the system design. In FIG. 6, the reconstructed video data 622 generated by Hardware Video Coding Accelerator 620 and delivered to Software Video Coding Decision Machine 610 may be reconstructed data before or after processing by the in-loop filters.

One or more functional blocks of the Video Encoder 500 in FIG. 5 are implemented by the software engine, for example, Software Video Coding Decision Machine shown in FIG. 6, while others are implemented by the hardware engine, for example, Hardware Video Coding Accelerator 620 shown in FIG. 6. It should be noted that embodiments of the software engine at least implements motion estimation and motion compensation functionality performed in Motion Compensation Prediction (MCP) 512 shown in FIG. 5.

Figure 7:
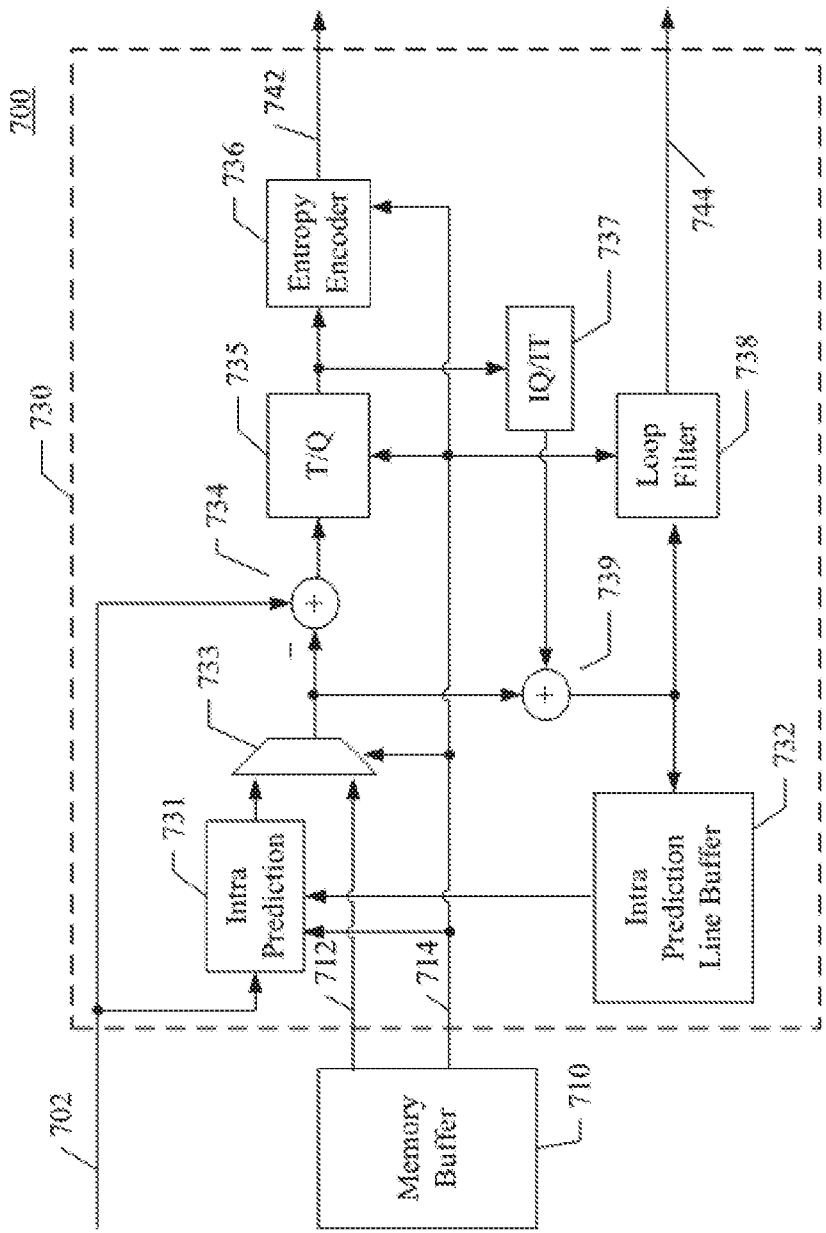
FIG. 7 illustrates an exemplary hybrid video encoder which complies with the ITU-T H.264 video compression standard.

An exemplary hybrid video encoder 700 which complies with the ITU-T H.264 video compression standard is illustrated in FIG. 7. FIG. 7 only shows some important functional blocks in Hardware Encoder Accelerator 730 as well as Memory Buffer 710 for supplying data to Hardware Encoder Accelerator 730, whereas the software engine of the hybrid video encoder 700 is omitted in FIG. 7. The hybrid video encoder 700 applies various coding tools to square blocks called macroblocks (MBs). A video sequence is a sequence of video pictures, and each video picture is composed of independent sections called slices, and slices consist of MBs. Each MB can be further divided into sub-blocks, which in turn, consist of pixels. A MB consists of separated blocks for luma and chroma components, each H.264 MB typically consists of one 16×16 luma block and two 8×8 chroma blocks. Similar to Hardware Video Coding Accelerator 620 shown in FIG. 6, the inputs of H.264 Hardware Encoder Accelerator 730 in FIG. 7 are source frame data 702, inter predictors 712, and control information 714. The inter predictors 712 and control information 714 are computed by the software engine of the hybrid video encoder 700 and are stored in Memory Buffer 710 before providing to H.264 Hardware Encoder Accelerator 730. Memory Buffer 710 may be implemented by one or more on-chip cache buffer, off-chip memory buffer, or a combination of on-chip and off-chip buffers. Some examples of the off-chip memory buffer are dynamic random access memory (DRAM), static random access memory (SRAM), and flash memory.

In this embodiment, the control information 714 is composed of mode information, motion information, macroblock quantization information, and deblocking filter parameters for all macroblocks (MBs) to be encoded by H.264 Hardware Encoder Accelerator 730. The software engine performs mode decision, for example, based on rate distortion optimization, to select the mode having a least rate-distortion cost, and output the mode information and/or motion information indicating the selected mode. The mode information indicates the mode for a current MB to be either Intra prediction or inter prediction, and the corresponding sub-block size. H.264 supports three types of intra prediction coding, denoted by Intra_16×16, Intra_8×8, and Intra_4×4, as well as inter prediction coding, denoted by P_16×16, P_16×8, P_8×16, P_8×8, P_8×4, P_4×8, P_4×4, and Skip mode. If the current MB is to be coded by intra prediction, the mode information may further indicate the intra sub-block modes such as Vertical, Horizontal, DC, and diagonal prediction modes. If the current MB is to be coded by inter prediction, the motion information in the control information 714 includes one or more motion vectors (MVs) and corresponding reference picture indices. The mode information is provided to Intra Prediction 731, Multiplexer 733, and Entropy Encoder 736, the motion information is provided to Entropy Encoder 736, the macroblock quantization information is provided to Transform and Quantization (T/Q) 735 and Entropy Encoder 736, and the deblocking filter parameter is provided to Loop Filter 738.

Multiplexer 733 in FIG. 7 selects intra predictors from Intra Prediction 731 or inter predictors 712 from Memory Buffer 710 according to the mode information included in the control information 714. The selected predictors are then subtracted from source frame data 702 by Adder 734 to generate a residual signal, and the residual signal is transformed and quantized in T/Q 735 before entropy encoding in Entropy Encoder 736. Entropy Encoder 736 generates a video bitstream 742 by encoding the transformed and quantized residual signal and the control information 714. The transformed and quantized residual signal is processed by inverse quantization and inverse transform in IQ/IT 737, then summed with the selected predictors in Adder 739, and stored in Intra Prediction Line Buffer 732 for Intra Prediction 731. The output of Adder 739 is also processed by Loop Filter 738 to generate Reconstructed Data 734. Reconstructed Data 734 output from H.264 Hardware Encoder Accelerator 730 will be delivered to the software engine of the hybrid video encoder 700 to be used in inter prediction.

The hybrid video encoder in an embodiment complies with the MPEG-4 video compression standard. The software engine of the hybrid video encoder determines the mode for each MB, if a current MB is determined to be coded in inter prediction, the software engine performs motion estimation and motion compensation to generate motion information and inter predictors and stores the inter predictors into cache buffer or off-chip memory buffer; if the current MB is determined to be coded in intra prediction, the hardware engine encodes the current MB with DC/AC prediction. Since there are statistical dependencies in DC and AC coefficients of the to-be-coded block and its neighboring blocks, the value of one block can be predicted from the corresponding value of one of the neighboring blocks. This is exploited in MPEG-4 video coding by the so-called DC/AC prediction. In this embodiment, the DC/AC prediction decision is computed by the hardware engine of the hybrid video encoder. The inter predictors and various control information generated by the software engine are retrieved by the hardware engine from a memory buffer (either cache buffer or off-chip memory buffer). The control information in this embodiment includes mode information, motion information for inter MBs, and MB quantization parameters. According to the mode indicated in the control information, the inter predictors or intra predictors generated from a DC/AC prediction module are subtracted from source frame data to generate residual signal. The residual signal is processed by discrete cosine transform (DCT) and quantization (Q) followed by variable length coding (VLC) to produce a video bitstream. A quantization module in the hardware part receives the MB quantization parameters determined by the software engine and performs the quantization operation. The motion information is incorporated in the video bitstream by a VLC encoder, which is implemented by hardware devices belonging to the hardware engine of the hybrid video encoder.

In another embodiment, please refer to FIG. 1, the video encoder (VENC) subsystem 108 in FIG. 1 is a hardware engine of the hybrid video encoder 100, which includes a video encoder (VENC) 118 and a memory management unit (VMMU) 119. Specifically, VENC 118 performs other encoding process other than that done by the programmable engine(s) such as intra prediction, transform, quantization, inverse transform, inverse quantization, reconstruction, entropy coding, post-processing and in-loop filtering. A main video buffer may be used to store video source frame, reconstructed pictures, deblocked pictures, or miscellaneous information used during video encoding. This main video buffer is usually allocated in an off-chip memory 12 such as a DRAM, SRAM, or flash memory accessed by a memory controller 110. However, this main video buffer may also be allocated in an on-chip memory such as an embedded DRAM.

An embodiment of the hybrid video encoder complies with the HEVC video compression standard may be referred to both FIG. 1 and FIG. 5. In this embodiment, Motion Compensation Prediction (MCP) 512 in FIG. 5 is implemented in one or more software subsystems such as DSP subsystem 102, GPU subsystem 104, CPU subsystem 106 of the hybrid video encoder 100, that is motion estimation and motion compensation operations are performed by one or more programmable engines such as DSP 112, GPU 114, and CPU 116 in FIG. 1. Reference Picture Buffer 532 of FIG. 5 may he a cache buffer 113, 115 or 117 in the DSP subsystem 102, GPU subsystem 104, or CPU subsystem 106 in FIG. 1. Alternatively, the Reference Picture Buffer 532 of FIG. 5 may he implemented by off-chip memory 12 in FIG. 1. Other main functional blocks in FIG. 5 can be implemented in a hardware encoding accelerator such as VENC subsystem 108 in FIG. 1. The programmable engine of this embodiment executes instructions to perform motion estimation and motion compensation to derive inter predictors. As described in above, the inter predictor consists of image blocks for luma component such as Y and chroma components such as U and V, each block having a plurality of image pixels, corresponding to a coding unit of the current picture. The programmable engines also determine block partition structure, mode for each partitioned block, intra prediction mode for intra coding units (CUs), motion information for inter CUs, quantized coefficients for quantization, and parameters for in-loop filters such as deblocking filter and SAO processing. The control information generated by the programmable engine therefore may include largest coding unit (LCU) descriptions such as split structure, CU partitioning, and CU type, intra modes, motion information, quantized coefficients, deblocking filter parameters, and SAO parameters. The inter predictors and control information can be stored either in one or more of the cache buffer 113, 115, 117 or the off-chip memory 12 by the one or more programmable engine 112, 114, and 116. In other embodiment, one or more of the cache buffer 113, 115, 117 and the off-chip memory 12 store the same copies of the inter predictors and control information. The hardware engine VENC 118 retrieves the inter predictors and control information by accessing one or more of the cache buffer(s) and off-chip memory 12 through the Bus 101. In this embodiment, the in-loop filter processing including deblocking filter and SAO processing is performed by the hardware subsystem. In another embodiment, the hardware subsystem outputs reconstructed data before deblocking or reconstructed data before SAO processing to the software subsystem, the programmable engine executes instructions to apply SAO processing or both deblocking filter and SAO processing to the reconstructed data and produce reference pictures for motion compensation prediction.

Similarly, an embodiment of the hybrid video encoder complies with the VP8 and VP9 video coding standard comprises a software engine and a hardware engine. The software engine of the hybrid video encoder executes instructions to produce inter predictors by performing inter prediction. The inter predictors includes image blocks for color components such as luma component Y, and chroma components U and V, are supplied to the hardware engine of the hybrid video encoder. The software engine also produces control information that is needed for the hardware engine to encode source frame data into a video bitstream. The control information of this embodiment includes block descriptions such as split information, macroblock (MB) or Superblock (SB) partitioning, MB or SB type, intra modes for intra MBs or intra SBs, motion information for inter MBs or inter SBs, quantization information, and deblocking parameters. Since VP8 and VP9 adopts fully arithmetic coding, an output of picture statistics is necessary in order to estimate a context probability table and re-encode using the estimated context probability table. In this embodiment, the software engine of the hybrid video encoder accurately estimates anew context probability table based on picture statistics computed by a statistical accumulator implemented in the hardware engine. The new context probability table is then provided to the hardware engine of the hybrid video encoder to re-encode the picture using the new context probability table.

In yet another embodiment, the hybrid video encoder is complied with the second generation of Audio-video coding standard (AVS2). The software engine of the hybrid video encoder generates control information for the hardware engine an that the hardware engine generates a video bitstream according to the given control information, where the control information in this embodiment includes block structure descriptions such as coding unit (CU), prediction unit (PU), transform unit (TU) partitioning, CU type, intra modes for intra PUs, motion information for inter PUs, quantization information, deblocking parameters, SAO parameters, and adaptive loop filter (ALF) parameters.

Figure 8:
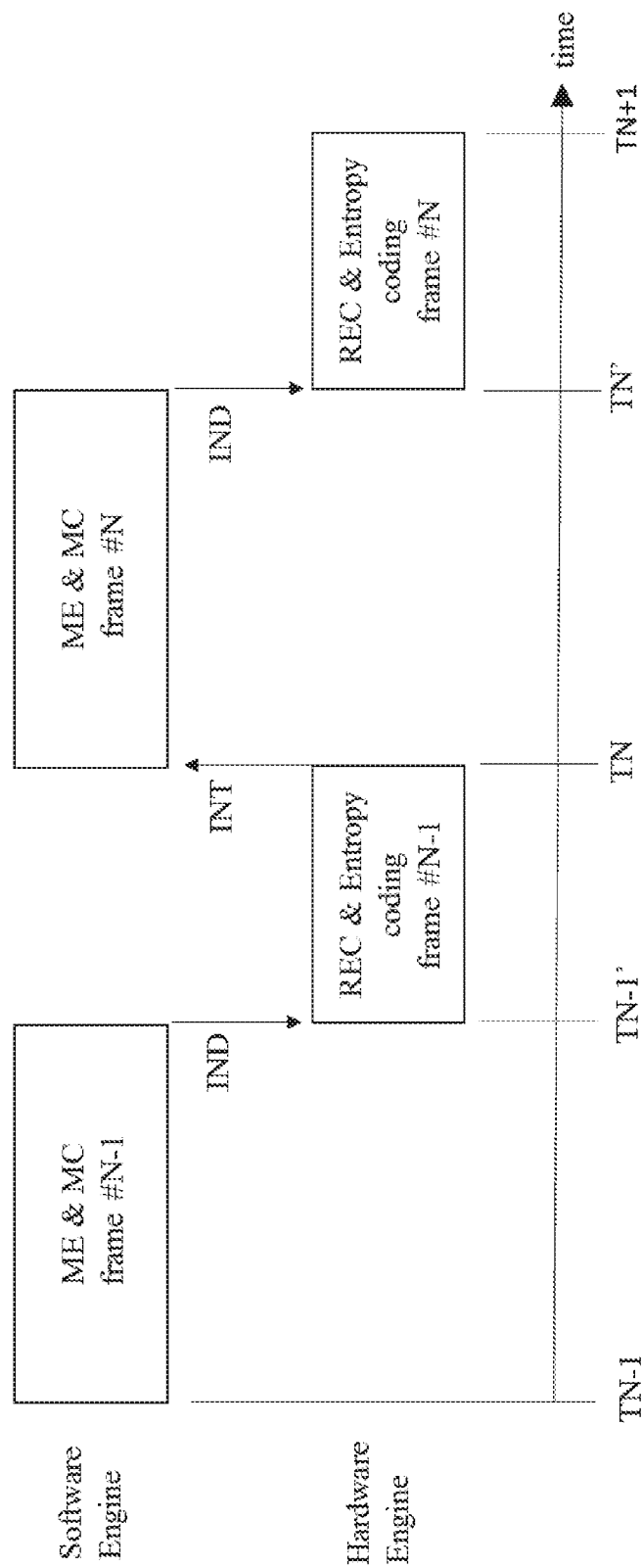
FIG. 8 is a diagram illustrating an example of a software engine and a hardware engine doing tasks and exchange information with a time interval of a frame encoding time

FIG. 8 is a diagram illustrating an example of a software engine and a hardware engine doing tasks and exchange information with a time interval of a frame encoding time. The software engine performs motion estimation (ME) and motion compensation (MC), and stores inter predictor and control information to a memory buffer. The hardware engine accesses the memory buffer for retrieving the inter predictor and the control information and does tasks other than motion estimation and motion compensation of the video encoding processing, such as transform (T), quantization (Q), invert transform (IT), inverse quantization (IQ), entropy encoding, reconstruction (REC) etc. In other words, data transfer/transaction between the software engine and the hardware engine due to the fact that the complete video encoding operation is accomplished by co-working of the software engine and the hardware engine. Preferably, the data transfer/transaction is performed between the software engine and the hardware engine through the memory buffer, e.g. cache buffer, or off-chip memory. The interaction interval here means the time or space interval that software and hardware engines should communicate to each other. An example of the communication method is sending an indication signal IND from the software engine to the hardware engine, and sending an interrupt signal INT from the hardware engine to the software engine. As shown in FIG. 8, the software engine generates an indicator IND at time $T_{N-1}'$ to notify the hardware engine, and transmits predictors and control information associated with frame N-1 to the memory buffer when finishing motion estimation and motion compensation of frame N-1. When notified by the software engine, the hardware engine refers to the information given by the software engine to start the following encoding steps associated with the frame N-1 for obtaining a corresponding reconstructed frame N-1 and a bitstream of compressed frame N-1. The hardware engine notifies the software engine by asserting interrupt signal INT when finishing the following encoding steps associated with frame N-1 at time $T_N$. As can be seen from FIG. 8, the software engine waits for processing next frame (e.g. frame N) until the hardware engine finishing its encoding process for previous frame (e.g. frame N-1).

Figure 9:
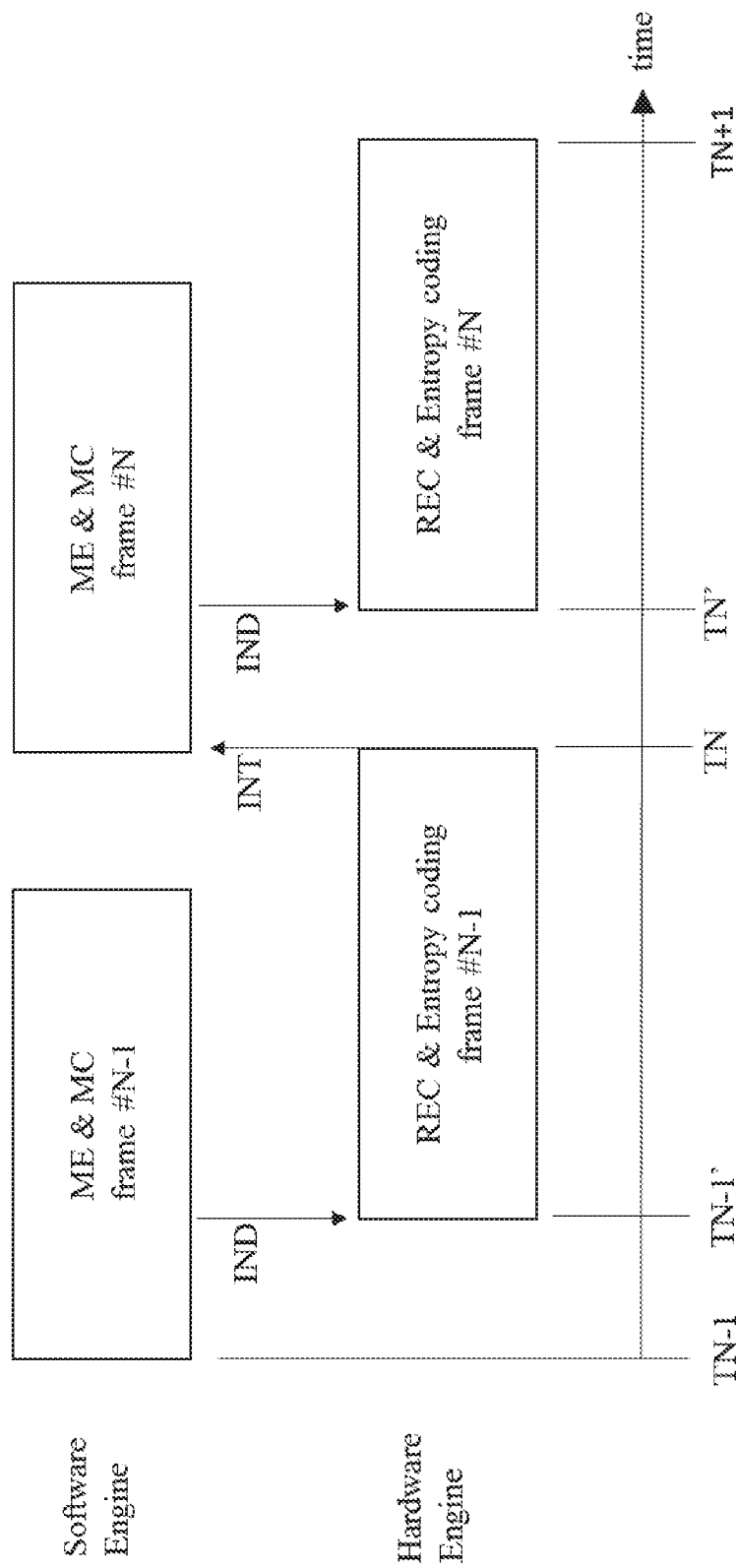
FIG. 9 is a diagram illustrating an example of a software engine and a hardware engine doing tasks and exchange information with a smaller time interval.

FIG. 9 is a diagram illustrating an example of a software engine and a hardware engine doing tasks and exchange information with a smaller time interval. The software engine performs motion estimation (ME) and motion compensation (MC), and stores inter predictor and control information to a memory buffer. The hardware engine accesses the memory buffer for retrieving the inter predictor and the control information and does tasks other than motion estimation and motion compensation of the video encoding processing, such as transform (T), quantization (Q), invert transform (IT), inverse quantization (IQ), entropy encoding, reconstruction (REC) etc. Preferably, the data transfer/transaction is performed between the software engine and the hardware engine through the memory buffer, e.g. cache buffer, or off-chip memory. The interaction interval here means the time or space interval that software and hardware engines should communicate to each other. Comparing with embodiment shown in FIG. 8, embodiment of FIG. 9 has a shorter interaction time interval which data transfer/transaction is performed when finishing encoding process of an image block which is smaller than a frame (e.g. a coding unit, a slice or a tile). As shown in FIG. 9, the software engine generates an indicator IND at time $T_{N-1}'$ to notify the hardware engine, and transmits predictor and control information associated with the image block of the frame N-1 to the memory buffer when finishing motion estimation and motion compensation of the image block of frame N-1. When notified by the software engine, the hardware engine refers to the information given by the software engine to start the following encoding steps associated with the image block of the frame N-1. As shown in the FIG. 9, after the software engine asserting the indicator IND, the software engine continuously performs motion estimation (ME) and motion compensation (MC) to subsequent image blocks of the frame N-1, and continuously asserting the indicator IND while finishing motion estimation (ME) and motion compensation (MC) to each of the subsequent image blocks of the frame N-1 so as to notify hardware engine. Thus the hardware engine performs the following encoding steps associated with the frame N-1 for obtaining a corresponding reconstructed frame N-1 and a bitstream of compressed frame N-1. The hardware engine notifies the software engine by asserting interrupt signal INT when finishing the following encoding steps associated with frame N-1 at time $T_N$. As can be seen from FIG. 9, the software engine waits for processing next frame (e.g. frame N) until the hardware engine finishing its encoding process for previous frame (e.g. frame N-1).

Embodiments of the hybrid video encoder may gain great hardware cost reduction by trading acceptable bandwidth and software computations. In comparison to the conventional pure hardware design, embodiments of the hardware engine in the hybrid video encoder have a reduced size by removing some video encoder hardware logic circuits and SRAM memory buffers. For example, the video encoder hardware logic circuits for motion estimation, motion compensation for the luma component, motion compensation for the chroma component are removed as motion estimation and motion compensation functions performed by the software engine of the hybrid video encoder. The SRAM memory buffers in the hardware engine originally allocated for search windows used for motion estimation and motion compensation of luma component and chroma component are also removed.

The software engine of the hybrid video encoder stores inter predictors and control information in a memory buffer. The hardware engine issues a data access request to access the inter predictor and control information from the memory buffer during video encoding. The inter predictors and control information will not be stored in a memory buffer when the video encoder is implemented in conventional pure hardware. As shown in FIG. 5, inter predictors generated by Inter Prediction module 512 in a conventional pure hardware video encoder are directly provided to Adder 516 and Reconstruction (REC) 526. Control information such as block partitioning structure, mode information, motion information, in-loop filter parameters are directly provided to Entropy Encoder 534 to be incorporated in the encoded video bitstream.

In the hybrid video encoder 100, 400 in FIG. 1, FIG. 4 and FIG. 6, the complete video encoding operation is accomplished by co-working of the software engine (e.g. DSP subsystem 102, GPU subsystem 104, CPU subsystem 106 or Software Video Coding Decision Machine 610) and the hardware engine (e.g. VENC subsystem 108 or Hardware Video Coding Accelerator 620). The data transfer/transaction is performed between the software engine and the hardware engine through a buffer. The design of data transfer/transaction is determined by a plurality of factors, including buffer capacity, data size, interaction interval etc.

In one embodiment, the motion estimation (ME) is conducted by the software engine and the motion compensation (MC) is conducted by the hardware engine. In such circumstance, since the data size of the motion vectors and control information may be small, the motion vectors and the control information generated by the software engine can be stored into cache buffer 113, 115, 117 for data transfer/transaction. Thus, the hardware engine can benefit from quick accessing to the cache buffer 113, 115, 117 through internal bus 101. In other embodiment, both the motion estimation (ME) and the motion compensation (MC) are conducted by the software engine. To the country, since the data size of the inter predictors generated by the software engine may be quite large, the inter predictors can be stored into off-chip memory buffer 12 for data transfer/transaction. The off-chip memory buffer 12 can be a larger and more cost-effective buffer than the cache buffer 113, 115, 117. Thus, the hardware engine has to access the off-chip memory buffer 12 to read inter predictors through the memory controller 110. In this embodiment, although the inter predictors are stored into off-chip memory buffer 12, the control information generated by the software engine can be stored into either the cache buffer 113, 115, 117 or the off-chip memory buffer 12.

In another embodiment, both the motion estimation (ME) and the motion compensation (MC) are conducted by the software engine and the interaction interval is short, e.g. data transfer/transaction happens per coding unit or macro block (MB). In other word, the software engine notifies the hardware engine of the data transfer/transaction is ready while an inter predictor of the coding unit or macro block been generated and stored into buffer. In such circumstance, since the data size of the inter predictor and the control information may be small enough to be stored into cache buffer 113, 115, 117, the inter predictor and the control information generated by the software engine are stored into cache buffer 113, 115, 117 for data transfer/transaction. Thus, the hardware engine can benefit from quick accessing to the cache buffer 113, 115, 117 through internal bus 101. In yet another embodiment, both the motion estimation (ME) and the motion compensation (MC) are conducted by the software engine and the interaction interval is long, e.g. data transfer/transaction happens per slice, per tile, or per frame. To the country, since the data size of the inter predictors corresponding to a plurality of coding units or macro blocks may be quite large, the inter predictors generated by the software engine can be stored into off-chip memory buffer 12 for data transfer/transaction. The off-chip memory buffer 12 can be a larger and more cost-effective buffer than the cache buffer 113, 115, 117. Thus, the hardware engine has to access the off-chip memory buffer 12 to read inter predictors through the memory controller 110. In this embodiment, although the inter predictors are stored into off-chip memory buffer 12, the control information generated by the software engine can be stored into either the cache buffer 113, 115, 117 or the off-chip memory buffer 12.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may he implemented in various combinations of hardware and software. For example, an embodiment of the present invention can be a circuit integrated into a video compression chip collaborated with program codes integrated into video compression software to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of encoding video data in a video coding system, comprising:
    receiving coding unit data associated with a current picture;
    performing a first part of a video encoding operation by a software engine to execute a plurality of instructions, wherein the first part of the video encoding operation comprises:
        generating an inter predictor and control information corresponding to the coding unit data of the current picture, wherein the inter predictor comprises image blocks for luma component and chroma components; and
        storing the inter predictor into a memory buffer; and
    performing a second part of the video encoding operation according to the control information by a hardware engine, wherein the second part of the video encoding operation comprises:
        receiving the inter predictor from the memory buffer;
        subtracting the inter predictor from the coding unit data to generate a residual signal;
        transforming, quantizing the residual signal to generate transformed and quantized residual signal; and
        encoding the transformed and quantized residual signal to generate an encoded video bitstream.

2. The method of claim 1, wherein the step of performing the first part of the video encoding operation comprises:

determining a description of the coding unit data in the current picture, wherein Me description comprises mode information, motion information, or both mode and motion information for the coding unit; and including the description in the control information and storing the control information in a cache buffer.

3. The method of claim 1, wherein the step of performing the first part of the video encoding operation comprises:

determining at least one adjustable header parameter for the current picture, wherein the adjustable header parameter comprises filtering information, reference picture indication, or both filter information and reference picture indication; and including the adjustable header parameter in the control information and storing the control information in a cache buffer.

4. The method of claim 1, wherein the second part of the video encoding operation further comprises one or a combination of an intra prediction operation, an inverse transform operation, an inverse quantization operation, a post processing operation, and a loop filter operation; wherein the hardware engine further generates one or more of reconstructed data corresponding to the current picture, and side information or statistics of the current picture.

5. The method of claim 1, wherein the first part of the video encoding operation comprises performing motion estimation and motion compensation on source frame data of the current picture using a reconstructed picture as a reference picture.

6. The method of claim 1, wherein the control information comprises mode information, motion information, quantization information, block partition structure, in-loop filter parameters, or a combination thereof.

7. The method of claim 1, wherein at least a portion of the control information generated by the software engine is incorporated in the encoded video bitstream.

8. A hybrid video encoder, comprising a software engine, arranged for performing a first part of a video encoding operation by executing a plurality of instructions, wherein the first part of the video encoding operation comprises:

generating an inter predictor and control information corresponding to a coding unit data of the current picture, wherein the inter predictor comprises image blocks for luma component and chroma components; and storing the inter predictor into a memory buffer; and a hardware engine, coupled to the software engine, the hardware engine arranged for performing a second part of the video encoding operation according to the control information, wherein the hardware engine comprises:

an adder, coupled to the memory buffer, for receiving the inter predictor and subtracting the inter predictor from the coding unit data to generate a residual signal;

a transformation circuit, couple to the adder, for transforming the residual signal to generate a transformed residual signal;

a quantization circuit, coupled to the transformation circuit, for quantizing the transformed residual signal to generate transformed and quantized residual signal; and an entropy encoder, couple to the quantization circuit, for encoding the transformed and quantized residual signal to generate an encoded video bitstream.

9. The hybrid video encoder of claim 8, wherein the software engine determines a description of the coding unit data in the current picture as the control information, the description comprises mode information, motion information, or both the mode and motion information for the coding unit.

10. The hybrid video encoder of claim 8, wherein the software engine determines at least one adjustable header parameter for the current picture as the control information, the adjustable header parameter comprises filtering information, reference picture indication, or both the filter information and reference picture indication.

11. The hybrid video encoder of claim 8, wherein the second part of the video encoding operation further comprises one or a combination of an intra prediction circuit, an inverse transform circuit, an inverse quantization circuit, a post processing circuit, and a loop filter circuit; wherein the hardware engine further generates one or more of reconstructed data corresponding to the current picture, and side information or statistics of the current picture.

12. The hybrid video encoder of claim 8, wherein the first part of the video encoding operation comprises performing motion estimation and motion compensation on source frame data of the current picture using a reconstructed picture as a reference picture.

13. The hybrid video encoder of claim 8, wherein the control information comprises mode information, motion information, quantization information, block partition structure, in-loop filter parameters, or a combination thereof.

14. The hybrid video encoder of claim 8, wherein at least a portion of the control information generated by the software engine is incorporated in an encoded video bitstream.

* * * * *